(12) United States Patent
Richardson

(10) Patent No.: US 11,455,627 B2
(45) Date of Patent: Sep. 27, 2022

(54) SYSTEM OF SECURITY USING BLOCKCHAIN PROTOCOL

(71) Applicant: HAVENTEC PTY LTD, Sydney (AU)

(72) Inventor: Ric B. Richardson, Coopers Shoot (AU)

(73) Assignee: HAVENTEC PTY LTD, Sydney (AU)

( * ) Notice: Subject to any disclaimer, the term of this patent is extended or adjusted under 35 U.S.C. 154(b) by 358 days.

(21) Appl. No.: 16/093,933

(22) PCT Filed: Apr. 13, 2017

(86) PCT No.: PCT/AU2017/000090
§ 371 (c)(1),
(2) Date: Oct. 15, 2018

(87) PCT Pub. No.: WO2017/177260
PCT Pub. Date: Oct. 19, 2017

(65) Prior Publication Data
US 2019/0122208 A1    Apr. 25, 2019

(30) Foreign Application Priority Data
Apr. 13, 2016 (AU) .................. 2016901453

(51) Int. Cl.
*G06Q 20/38* (2012.01)
*G06Q 20/06* (2012.01)
(Continued)

(52) U.S. Cl.
CPC ....... *G06Q 20/389* (2013.01); *G06F 16/1824* (2019.01); *G06Q 20/0658* (2013.01);
(Continued)

(58) Field of Classification Search
None
See application file for complete search history.

(56) References Cited

U.S. PATENT DOCUMENTS

2015/0206106 A1  7/2015  Yago
2015/0310424 A1  10/2015 Myers
(Continued)

FOREIGN PATENT DOCUMENTS

KR    10-0749247 B1   8/2007
WO    2016/156954 A1  10/2016

OTHER PUBLICATIONS

Mohit Kaushal, "The Blockchain: What it is and Why It Matters", Jan. 13, 2015 (Year: 2015).*

(Continued)

*Primary Examiner* — Jacob C. Coppola
*Assistant Examiner* — Timothy Paul Sax
(74) *Attorney, Agent, or Firm* — Ladas & Parry LLP

(57) ABSTRACT

A data record structure adapted for transmission over a network; the data record generated on a network device participating in a Blockchain which has an device unique identifier; the data record structure containing at least a first record and a first unique identifier record; the first record containing data for transmission over the network to a device having a receiving device unique identifier; the first unique identifier record containing the device unique identifier. Also disclosed is a method of verification of identity of devices participating in a block chain; said Block chain comprising a plurality of ledgers held on a plurality of network devices; said network devices communicating contents of the ledgers between them over a network; said devices verifying the contents of the ledgers as part of the step of communicating the contents of the ledgers; said method comprising incorporating a unique identifier of a network device within the ledger maintained by the network device.

21 Claims, 7 Drawing Sheets

(51) Int. Cl.
    *G06Q 20/40*     (2012.01)
    *H04L 9/32*     (2006.01)
    *H04L 9/40*     (2022.01)
    *G06F 16/182*     (2019.01)
    *H04L 9/08*     (2006.01)
    *H04L 9/14*     (2006.01)
    *H04L 9/00*     (2022.01)

(52) U.S. Cl.
    CPC ......... *G06Q 20/401* (2013.01); *H04L 9/0861* (2013.01); *H04L 9/14* (2013.01); *H04L 9/3239* (2013.01); *H04L 63/1441* (2013.01); *G06Q 2220/00* (2013.01); *H04L 9/50* (2022.05)

(56) References Cited

U.S. PATENT DOCUMENTS

| | | |
|---|---|---|
| 2015/0363777 A1 | 12/2015 | Ronca et al. |
| 2016/0071108 A1 | 3/2016 | Caldera et al. |
| 2016/0283941 A1* | 9/2016 | Andrade ............... H04L 9/3247 |
| 2017/0046651 A1* | 2/2017 | Lin ................... G06Q 30/0214 |
| 2017/0132630 A1* | 5/2017 | Castinado ............ G06Q 20/223 |
| 2017/0228731 A1* | 8/2017 | Sheng ................ G06Q 20/401 |

OTHER PUBLICATIONS

International Search Report (ISR) and Written Opinion (WO) dated Jul. 21, 2017 for Application No. PCT/AU2017/000090.

Written Opinion of the International Preliminary Examining Authority (IPEA) dated Mar. 16, 2018 for Application No. PCT/AU2017/000090.

Espacenet English abstract of KR 10-0749247 Bl.

Greenspan, G., "MultiChain Private Blockchain—White Paper", <http://web.archive.org/web/20160403063334/http://www.multichain.com/download/MultiChain-White-Paper.pdf>, retrieved from Internet, published on Apr. 3, 2016 as per wayback engine pp. 1-17.

* cited by examiner

SYSTEM OF SECURITY USING BLOCKCHAIN PROTOCOL

RELATED APPLICATION

This application is an application under 35 U.S.C. 371 of International Application No. PCT/AU2017/000090 filed on Apr. 13, 2017, the entire contents of which are incorporated herein by reference.

TECHNICAL FIELD

The present invention relates to a methodology and system components for attributing trust in network devices operating in a block chain environment. In an aspect it relates to the field of data record structures and, more particularly although not exclusively to those structures when used as part of a system for transmission of information using a block chain protocol which encapsulates specified data relating to the unique identity of at least a sending entity or device.

BACKGROUND

BitCoin and the BlockChain protocol are well known in the art. Principally the protocol has been used for applications in a state independent currency. Due to its highly secure nature and inherent mathematical integrity, the protocol is also an ideal opportunity for security applications although to date it has not been used as such.

In traditional use the BlockChain is a documented history of transactions showing both seller and buyer of tokens of value over time with an inbuilt ability to minimise the opportunity for fraudulent activity such as double spending of tokens.

Block chain structures in the context of initial use for Bitcoin storage and transactions is discussed in the publication: MultiChain Private Blockchain—White Paper by Dr Gideon Greenspan, Founder and CEO, Coin Sciences Ltd-available in the Wayback archive <http://web.archive.org/web/20160403063334/http://www.multichain.com/download/MultiChain-White-Paper.pdf> retrieved from Internet published on 3 Apr. 2016 as per wayback engine. The full disclosure of this document is incorporated herein by cross-reference including the following portions which are specifically quoted:

"Bitcoin is now recognized as a cheap, rapid and reliable method for moving economic value across the Internet in a peer to peer manner.
Blockchains and Tokenization
At the heart of bitcoin lies the blockchain, a global decentralized ledger which stores the full history of all bitcoin transactions. The blockchain is verified and stored by every node in the bitcoin network, of which there are approximately 6,000 in June 2015. The bitcoin protocol ensures that, barring temporary discrepancies, every node in the network has the same version of the blockchain, without requiring this consensus to be determined by a central authority. Another key feature of bitcoin (and the Blockchain structure) is that nodes can join or leave the network at any time, without disrupting the functioning of other nodes or the ongoing processing of transactions. New transactions can be created by any node and are propagated across the network in a Peer to peer fashion. Any node can take a set of these pending transactions and create ("mine") a new block containing them together with a link to the previous block. The new block "confirms" the transactions and is also propagated across the network. To prevent minority control over mining, bitcoin uses "proof of work" to make it computationally difficult and expensive to create a new block.

If a "fork" occurs, in which two competing blocks are mined almost simultaneously, proof of work also acts as a dispute resolution mechanism. Since blocks are hard to create, it is unlikely that both forks will grow at an identical speed. The protocol specifies that the fork with the greater amount of work is the correct one, so the network quickly regains a unified global consensus.

Along with bitcoin transactions, the blockchain can be used to store any digital data. While some view such uses as "bloating the blockchain", bitcoin's decentralized nature means that they cannot effectively be stopped. This led the developers of Bitcoin Core, the official bitcoin client, to introduce an official mechanism for adding arbitrary metadata to transactions in early 20143. This mechanism is used by services such as Proof of Existence and BlockSign to notarize the existence of a document by embedding a digital signature of that document inside a transaction. Other tools such as phpOP_RETURN enable larger pieces of data to be stored and retrieved from the blockchain, turning it into a general purpose permanent decentralized data store."

A feature of the design of the BitCoin network is the innate security of a wallet that is secured by public key encryption where the private key of the public key pair is kept secret. The wallet and therefore the owner of the wallet is identified by its public key. This is known in the art. The concern is that whilst the block chain structure provides security of data contained within the wallet there may exist a vulnerability to compromise in the network device or device which houses the wallet and otherwise forms part of or participates in the block chain.

For example the entire network device may be replaced without other participating members of the block chain being aware that this has happened. This can lead to spoofing or equivalent vulnerabilities.

It is an object of the present invention to seek to improve the integrity of network devices or devices forming nodes in a block chain and thereby to improve the integrity of the block chain and the data stored and transmitted within it.

It is observed that there are other identifiers of a user or more specifically their device participating in the Blockchain. Identifiers available for verification of identity may include for example a device's IP number on a public or private network. Heretofor these have not been utilised to assist in improving the integrity of network devices or devices within the block chain.

Including this information in a transaction record such as the BlockChain may allow additional applications to be made of the BlockChain protocol.
Notes The term "comprising" (and grammatical variations thereof) is used in this specification in the inclusive sense of "having" or "including", and not in the exclusive sense of "consisting only of".

The above discussion of the prior art in the Background of the invention, is not an admission that any information discussed therein is citable prior art or part of the common general knowledge of persons skilled in the art in any country.

BRIEF DESCRIPTION OF INVENTION

Accordingly, in one broad form of the invention, there is provided a data record structure adapted for transmission over a network; the data record structure generated at an initiating device which has an initiating device IP address; the data record structure containing at least a first record and a first IP address record; the first record containing data for transmission over the network to a device having a receiving device IP address; the first IP address record containing the initiating device IP address.

In a further broad form of the invention there is provided a data record structure adapted for transmission over a network; the data record generated on a network device participating in a Blockchain which has a device unique identifier; the data record structure containing at least a first record and a first unique identifier record; the first record containing data for transmission over the network to a device having a receiving device unique identifier; the first unique identifier record containing the device unique identifier.

Preferably data from or pertaining to the first record is contained in a ledger.

Preferably the data record structure is contained within a wallet.

Preferably the data record structure further includes a second IP address record.

Preferably the second IP address record contains the receiving device IP address.

Preferably the data record structure further includes a second record.

Preferably the data record structure further includes a third record.

Preferably the first record contains token identifying data which uniquely identifies a token.

Preferably the token is exchanged between the initiating device and the receiving device.

Preferably the second record contains data which uniquely identifies a sending party.

Preferably the third record contains data which uniquely identifies a receiving party.

Preferably the data record structure further includes a hash range.

In yet a further broad form of the invention there is provided a transmission system for transmission of the data record structure defined above.

Preferably the data record structure is stored on an intermediate database as an intermediate database record.

Preferably a hash of the data record structure is stored on the intermediate database as part of the intermediate database record.

Preferably the intermediate database record is stored on a plurality of intermediate databases; each intermediate database separate and distinct from any other of the plurality of intermediate databases.

Preferably the plurality of intermediate databases form part of a BlockChain network.

Preferably the data record structure is accompanied by a public key which is shared with the rest of the network for identification, encryption and decryption purposes.

Preferably the data record structure includes a private key which is used for authentication, encryption and decryption purposes.

Preferably the wallet also has access to a transaction ledger which uses block chain protocols to remain in sync with other ledgers in the network.

Preferably when a token is received by a wallet, the token is then re routed to another wallet which also has its own public key, private key and associated ledger.

Preferably when a token is sent from one wallet to another, information about the transaction is recorded in ledgers including but not limited to the identity of the token, the identity of both the sending and receiving wallets, and the time of the transaction.

Preferably the IP numbers of both the sending and receiving device are also recorded in the transaction ledger thereby to establish and maintain a history of ownership and integrity of association between the IP number and a secure wallet.

Preferably the history of trust can be used to detect attempts to impersonate a device on the network.

Preferably the above described system incorporates an automatic resend capability.

Preferably when a wallet receives a token from another wallet, a timer and timing mechanism is set to automatically forward the token on to another device on the network.

Preferably the timing mechanism ensures that all devices on the network receive a regular delivery of tokens and helps to ensure that the transaction ledger remains current and active.

Preferably the wallet also has built in rules that are used to define if the wallet will receive or reject tokens that are sent to it.

Preferably if the IP number of the device sending the token does not exist in the transaction ledger then the system rejects the transaction.

Preferably if the token identity is not known and not in the ledger then the system rejects the token.

Preferably if the IP address recorded in the transaction record of the sending device does not match the IP address of the device sending the token, then the token is rejected by the system.

Preferably when the timing mechanism sends a token on to another device in the network, the system is programmed to send the token to the network device that has not had a delivery of a token for the longest time thereby to ensure that all devices on the network get a good average of transactions over time.

Preferably a good average is achieved by looking at the transaction ledger and finding the IP number of the device that has not had a token sent to it for the longest time.

Preferably the system thereby ensures that no individual device on a network is allowed to be ignored or excluded from regular transactions and also can be used to trigger an investigation as to why the device is no longer available on the network.

In yet a further broad form of the invention there is provided a method of verification of identity of network devices participating in a block chain; said Block chain comprising a plurality of ledgers held on a plurality of said network devices; said network devices communicating contents of the ledgers between them over a network; said devices verifying the contents of the ledgers as part of the step of communicating the contents of the ledgers; said method comprising incorporating a unique identifier of a network device within the ledger maintained by the network device.

Preferably the network device stores a data record structure adapted for transmission over a network; the data record generated on the network device participating in a Blockchain as an initiating device which has an initiating device unique identifier; the data record structure containing at least a first record and a first unique identifier record; the first record containing data for transmission over the network to a device having a receiving device unique identifier; the first unique identifier record containing the initiating device unique identifier.

Preferably data from or pertaining to the first record is contained in a ledger.

Preferably the data record structure is contained within a wallet.

Preferably the data record structure further includes a second IP address record.

Preferably the second IP address record contains the receiving device IP address.

Preferably the data record structure further includes a second record.

Preferably the data record structure further includes a third record.

Preferably the first record contains token identifying data which uniquely identifies a token.

Preferably the token is exchanged between the initiating device and the receiving device.

Preferably the second record contains data which uniquely identifies a sending party.

Preferably the third record contains data which uniquely identifies a receiving party.

Preferably the data record structure further includes a hash range.

In a further broad form there is provided a methodology to provide a predetermined level of confidence that a machine or network device in a block chain network is the machine or network device you think it is. Token rotation keeps tokens current. If the token is rotated often enough then it is easy to see if a device has changed its unique identifier or has dropped off the network.

In a further aspect we are combining both a user ID (preferably the public key) with a machine fingerprint within the ledger operating in a block chain environment so that it will be immediately detected if the machine fingerprint changes next time a token transfer session takes place with that machine.

DRAWINGS

Embodiments of the present invention will now be described with reference to the accompanying drawings wherein.

DESCRIPTION AND OPERATION

Figure 1:
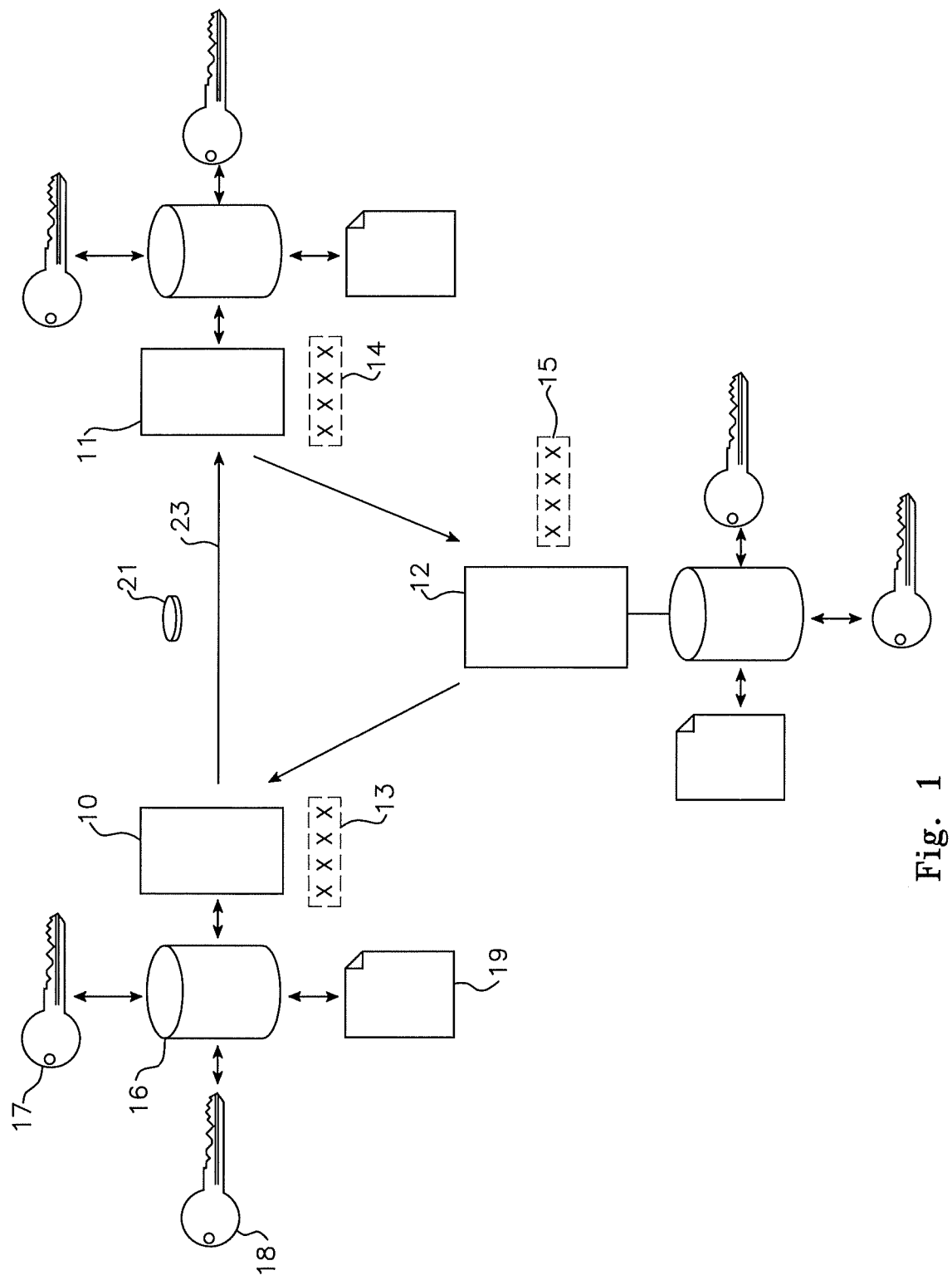
FIG. 1 illustrates the main components of an example embodiment

FIG. 1 discloses the main components of the example embodiment. Each BlockChain network comprises multiple devices 10 11 12, each of which have and typically must have a unique IP address 13 14 15. For each device 10 11 12 to be part of a BlockChain network, each device 10 11 12 would typically have a wallet 16 that is accompanies by a public key 17 which is shared with the rest of the network for identification, encryption and decryption purposes, as well as a private key which is used for authentication encryption and decryption purposes.

The wallet 16 would also be accompanied by a BlockChain transaction record 19. Typically it 19 would not traditionally include the IP number of each sender and receiver of network tokens 21, however in the case of the example embodiment, the IP number of both sender 22 and receiver 23 in a transaction are included. All devices in the network 10 11 12 each have a wallet.

Figure 2:
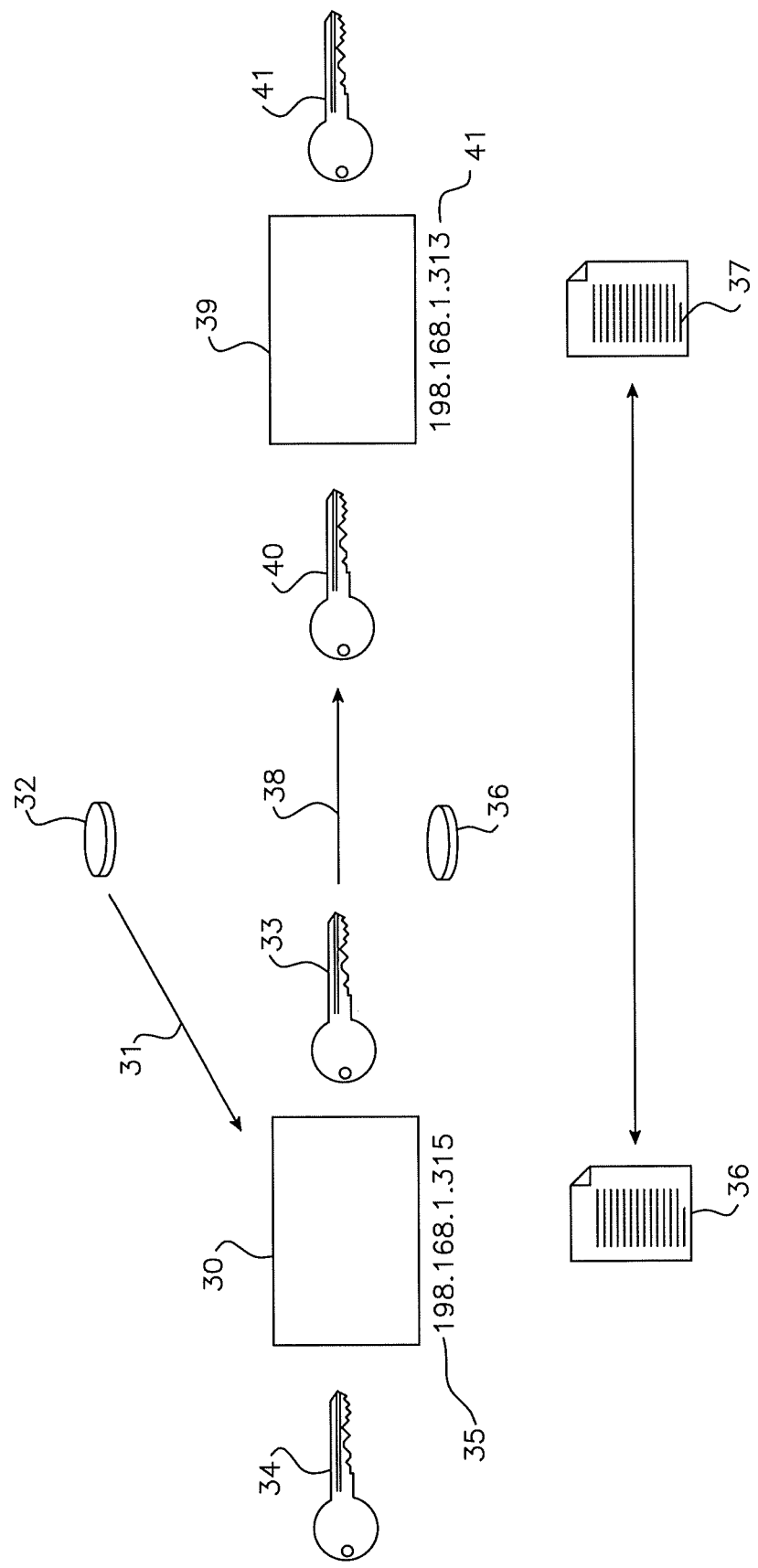
FIG. 2 illustrates a transaction of the example embodiment

FIG. 2 discloses an example transaction of the example embodiment. A wallet 30 receives 31 a token from another wallet on the network. The wallet 30 includes a public key 33 which is used for encryption and decryption as well as identification. The wallet 30 also has a private key 34 which is used for encryption, decryption and authentication. The wallet 30 also has an associated device IP address 35. The wallet 30 also has access to a transaction ledger 36 which uses block chain protocols to remain in sync with other ledgers 27 in the network.

When a token 32 is received by a wallet 30, the token 36 is then re routed to another wallet 39 which also has its own public key 40, private key 41 and associated ledger 37. This wallet is also associated with a device IP number 42.

When a token 36 is sent 38 from one wallet to another, information about the transaction is recorded in ledgers 36 37 including but not limited to the identity of the token 36, the identity of both the sending 33 and receiving wallets 40, and the time of the transaction.

In the case of the example embodiment, the IP numbers of both the sending 35 and receiving device 42 are also recorded in the transaction ledger 36 37. The benefit of this is that a history of ownership and integrity of association between the IP number and a secure wallet is established. This history of trust can be used to detect attempts to impersonate a device on a network.

If an intruder steals an IP number but does not have a legitimate secure wallet the impersonation can be easily detected.

The ledgers 36 37 use a system of digital signing that is known in the art as a means of tamper proofing the recorded information and verifying that the sender and receiver are who they say they are.

Figure 3:
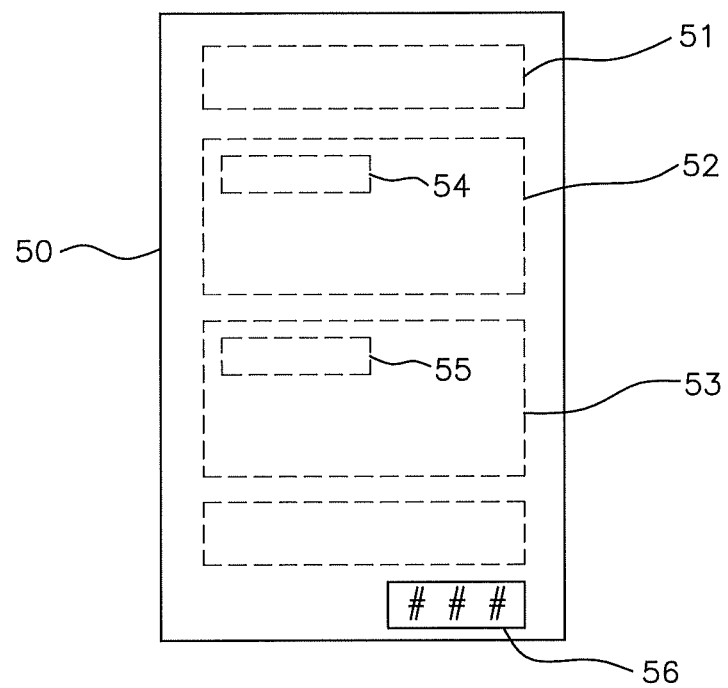
FIG. 3 illustrates detail of a transaction of the example embodiment

FIG. 3 discloses details of a transaction of the example embodiment. A transaction record 50 typically contains information about the token being exchanged 51, information about the sending party 52 and the receiving party 53. However in the case of the example embodiment, the IP number of the sending device 54 and the IP address of the receiving device 55 are also included in the transaction record 50. This information is then hashed 56 using a process known in the art and digitally signed using a process that is known in the art.

This process of hashing and signing the transaction record, means that the record cannot be tampered with or changed in order to manipulate data in the record including but not limited to the IP address of the sending or receiving devices.

Figure 4:
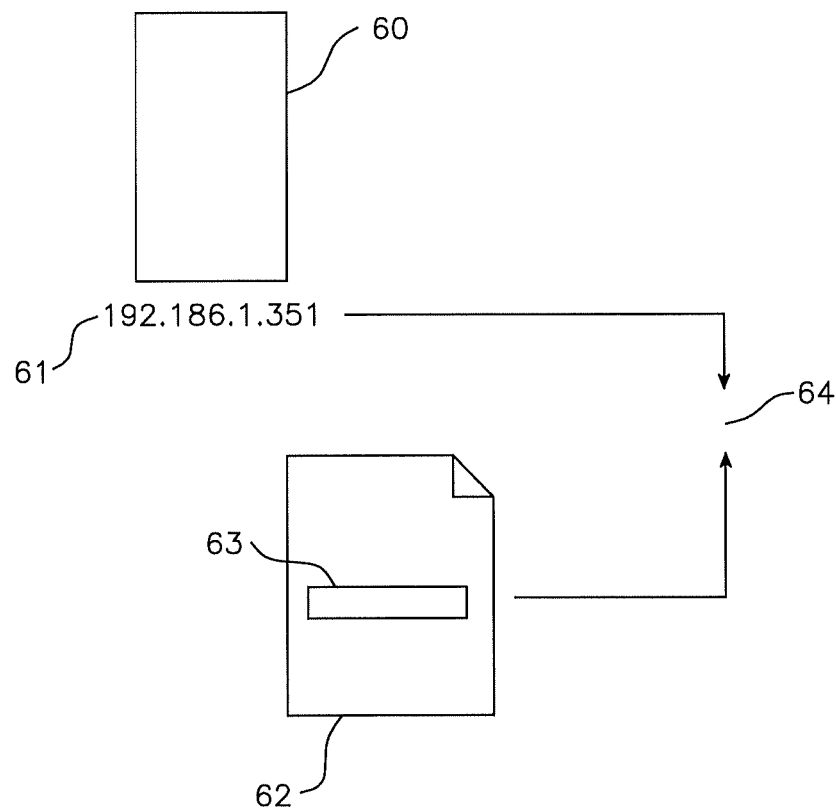
FIG. 4 illustrates the unique identifier verification process of the example embodiment

FIG. 4 shows the IP verification process of the example embodiment. A device 60 referred to in a transaction file 62 typically has a unique IP address 61, which can be recorded as part 63 of a transaction file 62 which is then hashed and signed to maintain its integrity.

The fact that the recorded IP address and the IP of the device either sending or receiving tokens can be independently verified 64 means that the veracity of a device's IP address can be checked and verified and a decision made as to whether other parties can trust that device and its identity.

Figure 5:
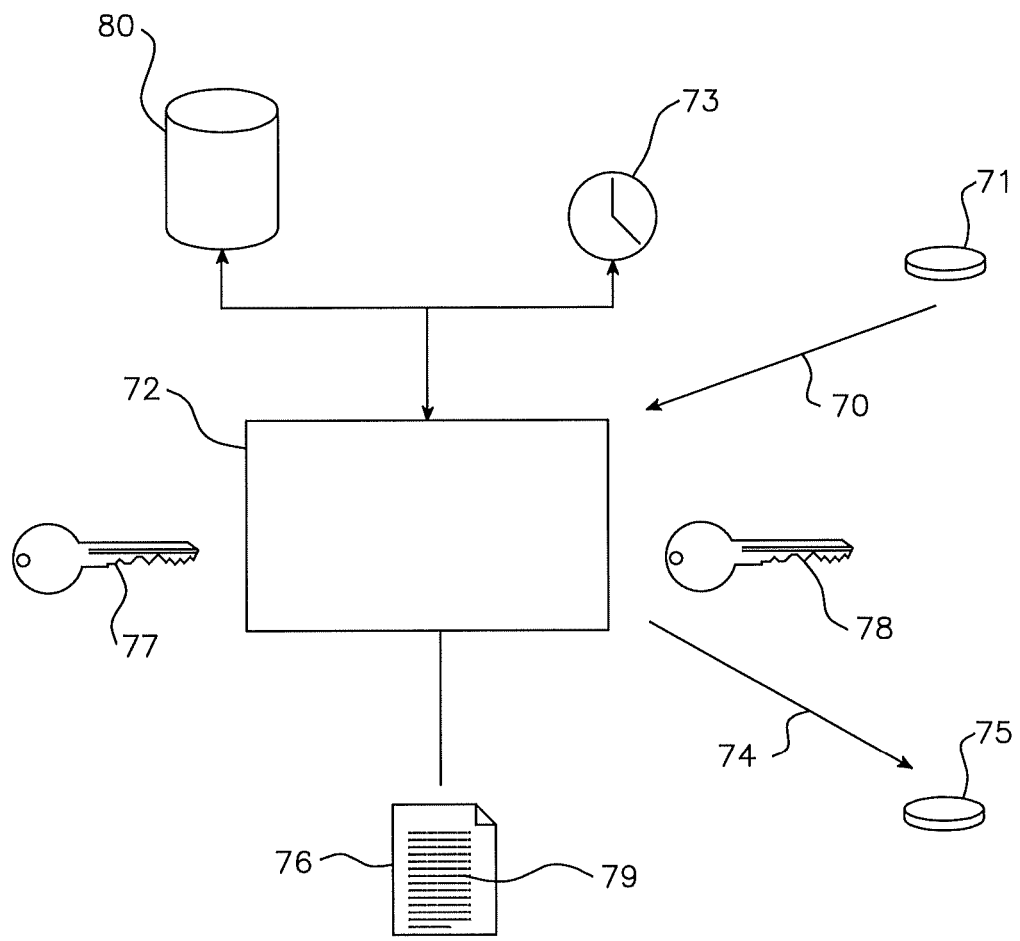
FIG. 5 illustrates an automatic resend of token capability of the example embodiment.

FIG. 5 discloses the automatic resend of token capability of the example embodiment. When a wallet 72 receives 70 a token 71 from another wallet, a timer 73 and timing mechanism is set to automatically forward 74 the token 71 on to another device on the network 75. This is done to ensure that all devices on the network receive a regular delivery of tokens and helps to ensure that the transaction ledger remains current and active.

The wallet 72 also has built in rules 80 that are used to define if the wallet will receive or reject tokens 71 that are sent to it. For example, if the IP number of the device sending the token 70 does not exist in the transaction ledger 76 then reject the transaction. If the token identity is not known and not in the ledger then reject the token. Another example is when the IP recorded in the transaction record of the sending device does not match the IP of the device sending the token, then the token is rejected.

When the timing mechanism sends a token onto another device in the network, it would typically want to send the token to the network device that has not had a delivery of a token for the longest time top ensure that all devices on the network get a good average of transactions over time.

This can be achieved by looking at the transaction ledger 76 and finding the IP number of the device 79 that has not had a token sent to it for the longest time. This method ensures that no individual device on a network is allowed to be ignored or excluded from regular transactions and also can be used to trigger an investigation as to why the device is no longer available on the network.

Further Embodiment

Figure 6:
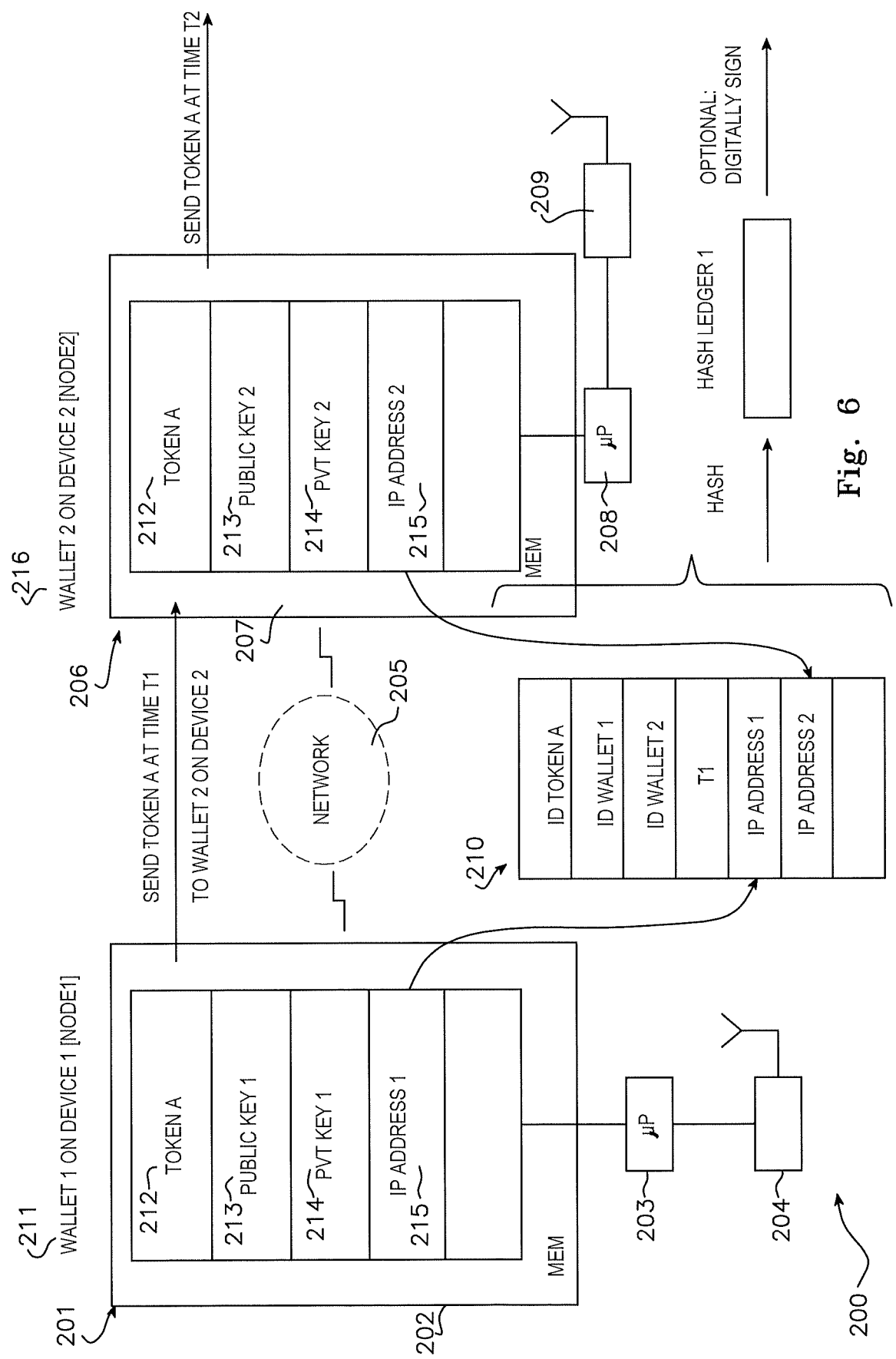
FIG. 6 is a block diagram of a system operating according to a further embodiment.

With reference to FIG. 6 there is illustrated a system 200 in accordance with a further embodiment of the present invention providing additional security to a block chain system.

In this instance the system includes at least a first node 201. In this instance the node 201 comprises a network device in the form of a server having at least a memory 202, a processor 203 and an input/output device 204 operable to communicate over a network 205 with at least a second node 206. In this instance the second node 206 also comprises a network device in the form of the server comprising at least memory 207 in communication with processor 208 which, in turn, is in communication with input output device 209. In alternative forms the network device may comprise a router. In alternative forms it may comprise any intelligent device which is network connected and has sufficient processing power to perform the functions outlined for this embodiment.

The system 200 operates in a block chain environment in accordance with Block chain protocols and includes the transmission and retention of data and related meta data in a ledger structure 210. Additional details of at least generalised forms of Block chain protocols and utilisation of the ledger structure are given further below with reference to FIGS. 7 and 8.

In use the system 200 includes information stored in a wallet 211 within memory 202. Fields in the wallet, in this instance, include a token field 212, a public key field 213, a private key field 214 and a device identifier field 215. Corresponding fields are structured into the wallet 216 of second node 206 and, indeed, into any other device operating within the block chain of system 200.

In use, in one form the wallet 211 contains a unique identifier for device 201 in its identifier field 215. In a preferred form the unique identifier is the IP address of the device 201. In alternative forms it may be the MAC address of the device 201. In yet other forms it may be related to the hardware comprising the device 201.

As part of the transmission of a token A over network 205 from first wallet 211 to second wallet 216 various items of information in the form of data are stored in the ledger as generally illustrated in FIG. 6. These include the identity of the first wallet—in a preferred form being the public key of the first wallet 211 stored in record 213. Also stored in the ledger 210 will be the unique identifier of the device 201 which houses the wallet 211-in this specific instance the IP address of the device 201. The ledger 210 is subject to steps to assist in its verification in accordance with Block chain protocols. In one form this can include applying a hash algorithm to the data in the ledger. In a further form this may additionally include digitally signing the resulting hash of the data. This step allows comparison to be made against the data in the ledger at subsequent times, preferably at the times when a token is either transmitted to or from the wallet whereby if the unique identifier of the device 201 which houses the wallet 211 changes this will be detected-for example by detecting that the hash value has changed.

In preferred forms the token A is transmitted from device to device on the network on a rotating basis to ensure that every device receives or sends the token A over a predetermined period of time thereby to test the integrity/identity of each device on the network that is participating in the block chain.

You will be noted that this testing of integrity/identity of device 201 will occur in effect automatically as part of the normal following of the block chain protocol by virtue of inclusion of the device identifier within the ledger 210.

In a preferred form the token A may simply comprise an alphanumeric sequence whose primary purpose is to be sent from device to device thereby to trigger tests of device identity by way of ledger verification that takes place as part of the block chain protocol. In other forms the token A may have a representative value-for example it may represent an element of bit coin value—for example 1 Satoshi in Bitcoin value.

In yet other forms the token A may be an element of data that is desired to be transmitted from one wallet to another for reasons associated with the intrinsic nature of the data as a unit of currency or as a unit of information.

A byproduct of this routine checking of identity is that as the number of transactions on a particular network device rises there is an inference of reliability of that network device and its identity. Conversely where a network device has changed its unique identifier then a decision may be made not to send data to the wallet on that machine for at least a predetermined period of time.

Broadly the idea is to provide a certain level of confidence that a machine or network device in the block chain network is the machine or network device you think it is. Token rotation keeps tokens current. If the token is rotated often enough then it is easy to see if a device has changed its unique identifier or has dropped off the network.

In one aspect we are combining both a user ID (preferably the public key) with a machine fingerprint within the ledger operating in a block chain environment so that it will be immediately detected if the machine fingerprint changes next time a token transfer session takes place with that machine.

In another aspect the above described methodology provides a method of introduction of a new network device or machine onto a network.

This methodology can be given effect by designating a mother wallet or initiating wallet which allocates/sends out new tokens to a new network device.

The new network device has to build a wallet then the mother wallet sends a first token to it thereby to initiate the machine/network device onto the block chain network of which it is to become a trusted part.

Block Chain Structures

Blockchain structures as described elsewhere in this specification and below are used with any of the above described embodiments.

Figure 7:
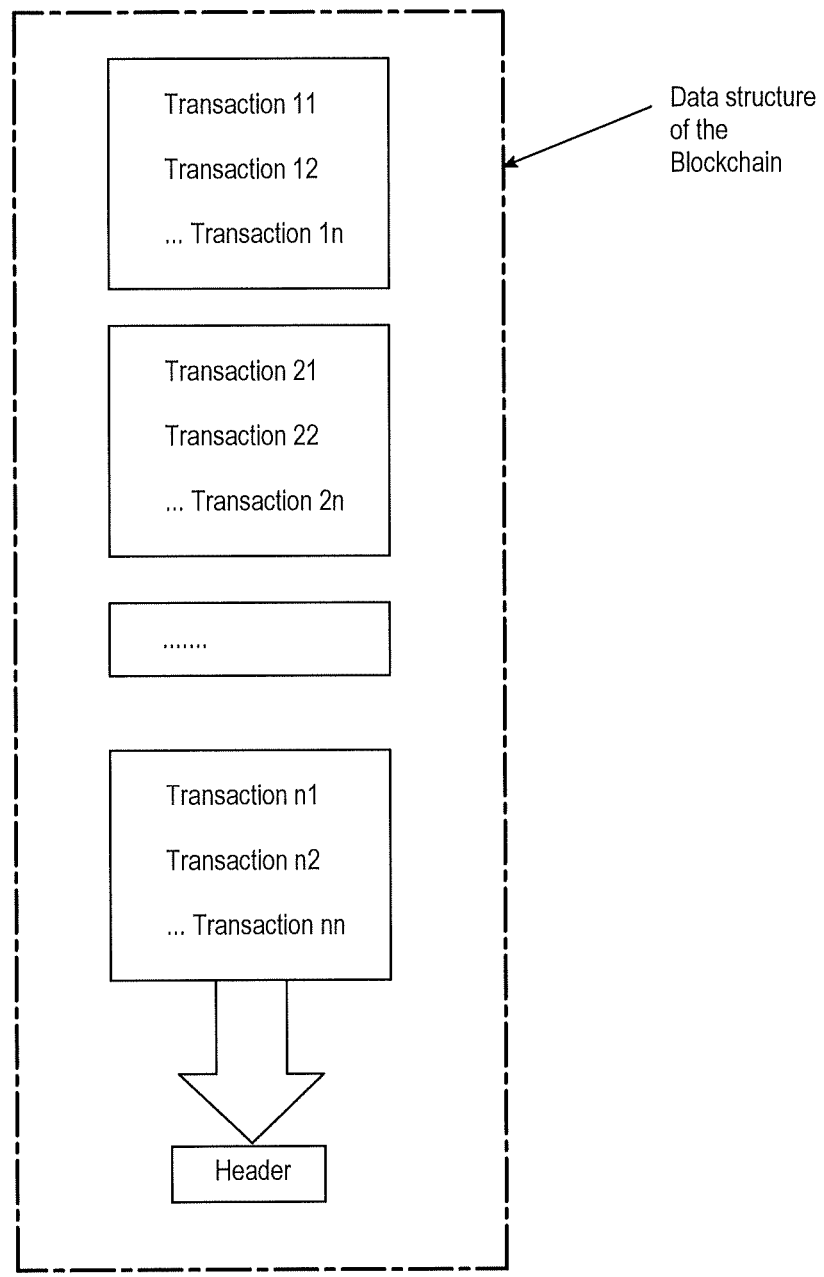
FIG. 7 is a data structure diagram usable in accordance with blockchain protocol.

FIG. 7 is a diagram of an exemplary block chain data structure.

Figure 8:
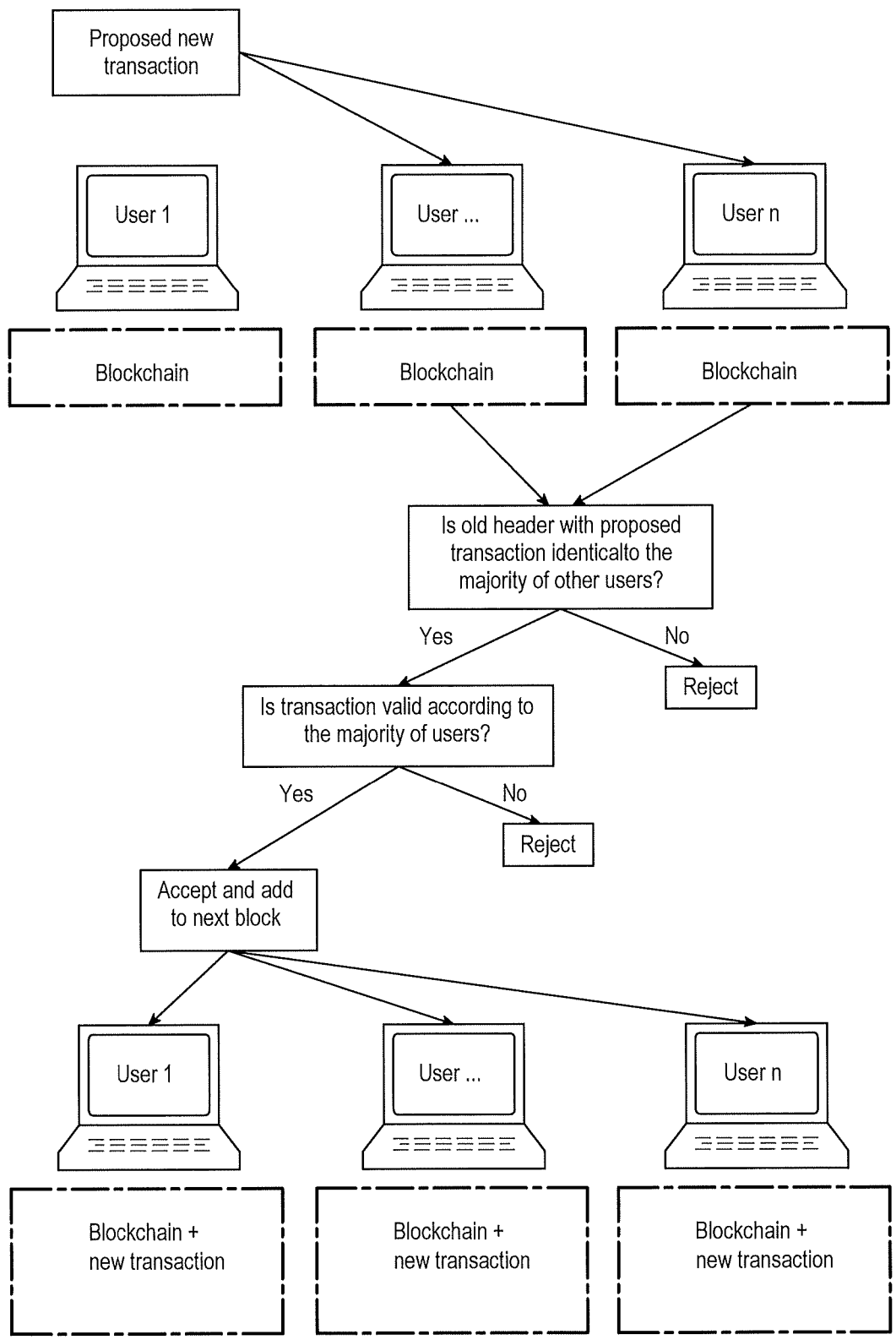
FIG. 8 is a network diagram of devices participating in a blockchain.

FIG. 8 illustrates diagrammatically use of the block chain data structure of FIG. 7.

With reference to FIGS. 7 and 8, Blockchain is a data structure and distributed record system which seeks to provide a data structure and system which in preferred forms maintains a complete record of all transactions and minimizes risk of retrospective alterations, or double or identical transactions.

The data structure consists of a series of transactions grouped in blocks, which need to be verified before they are added to the chain. Rules may be set so no data is ever deleted, with the longest chain being taken to be the most recent, and so the chain records all transactions from its initiation in chronological order.

A copy of the chain may be kept by all users, and so is a distributed record system. Before any transactions are added the majority of the users need to agree that the transaction is acceptable and then it is bundled with other acceptable transactions into a block, which is added to the chain. Each block has a header which can only be created knowing all the previous transactions. As a result, if a retrospective alteration is made the header will be incorrect and any new block proposed by that user will be rejected. The security of the system is further enhanced by having mathematical problems that can only be solved by trial and error, which use the header and must be solved and then verified by the majority of other users before a block is accepted into the chain by all users. As long as there are more genuine users than coordinated attackers trying to alter the chain then the chain will be secure. There may be other methods used to determine the veracity of a block of data, this may include voting or consent processes where parties with a stake in the transaction or related transactions or in the chain itself are granted 'voting' rights. Another process may involve a random or systematized voting or approval system where the validity of the block of data is approved in accordance with a set of protocols agreed by those with a stake in the veracity of the chain of data.

In a more particular form, each block includes verified transactions and the blockchain maintains a ledger all prior transactions. The blockchain is duplicated by all the computers on a network.

The first block in the chain is known as the Genesis block and new blocks can be added in linear and chronological order. From any given block in the chain the information of this genesis block and all blocks that led back to this one can be retrieved. A blockchain is essentially numerous blocks connected through hash chaining where each block is comprised of the following Timestamp: provides proof that the data in a block existed at a particular time
Previous Hash: Essentially a pointer to the previous block
Merkle Hash: Summary of all executed transactions
Nonce: Individual blocks identity and is an arbitrary number which can only be used once The blockchain is managed by a network of distributed nodes where each node contains a copy of the entire blockchain. Each node in the network can add blocks to the chain, where every node is adding blocks at the same point in the chain at the same time. The more nodes that comprise the network the harder it is to disrupt the storage of the blockchain. Unlike centralised systems which rely on a single authority, there is no single point of failure in these distributed nodes network. If you change the content of a block you change its Hash.

Alternative Embodiments

The rules mentioned with reference to FIG. 5 are examples. An alternative embodiment may use any set of rules to govern the acceptance, rejection of tokens and the control of the wallet.

The example embodiment uses a device IP as an identifier of the device sending or receiving tokens. An alternative embodiment may use any externally verifiable information that can uniquely identify a device and be verified by a second party. Examples include a Mac address of a device or serial numbers of component parts of the device. Preferably the identifier is not able to be modified easily or at all by a second party without security clearance. Additionally the external unique identifier would be included in the transaction record and also included in the hash calculation and digital signing by the sending or receiving party or parties.

The example embodiment shows only a few devices in the network for simplicity. An alternative embodiment may have any number of devices in the network.

The example embodiment uses the standard hashing and digital signing methodologies commonly used in BlockChain networks. An alternative embodiment may use any method of integrity, authentication and identification methods available.

The example embodiment uses a timing rule as a means of triggering when a token that is received is resent to another device on the network. An alternative embodiment could use any triggering calculation or method to ensure that tokens are circulated at a regular interval amongst the devices on the shared network. Parameters such as network congestion and the ideal level of security through regular identity verification can be factors that can be included in the calculation of how regularly each wallet shares tokens amongst the other computers in the network.

The invention claimed is:

1. A transmission system which comprises:
   a plurality of network devices, wherein each network device comprises a network participating device, and wherein each network device includes at least a processor and memory by which each network device communicates data record structures between the network devices;
   the transmission system programmed to:
      transmit the data record structures over a network of the network participating devices, wherein the network of the network participating devices operates as a Blockchain that comprises a plurality of ledgers held on a plurality of said network participating devices, wherein each ledger comprises said data record structures;
   the network participating devices programmed to:
      communicate contents of the ledgers between them over the network and verify the contents of the ledgers;

generate, by an initiating device of the network participating devices, an initial data record structure wherein, the initiating device has an initiating device has an initiating device unique identifier and the initial data record structure contains at least a first record comprising:
  a token; and
  the initiating device unique identifier;
transmit, by the initiating device, the initial data record structure over the network to a first receiving device of the network participating devices, wherein the first receiving device has a first receiving device unique identifier
test, by the first receiving device, the integrity and identity of the initiating device by performing the following:
  compare the initiating device unique identifier contained in the first record with the initiating device unique identifier; and
  determine that the initiating device is trustworthy based on the comparison showing that the initiating device unique identifier contained in the first record matches the initiating device unique identifier;
accept the token, by the first receiving device, based on the determination that the initiating device is trustworthy;
generate, by the first receiving device, an additional data record structure that contains at least a second record comprising:
  the token, and
  the first receiving device unique identifier;
transmit by the first receiving device, the additional data record structure to a second receiving device of the network participating devices that has not yet received the token;
test, by the second receiving device, the integrity and identity of the initiating device by performing the following:
  compare the first receiving device unique identifier contained in the second record with the first receiving device unique identifier;
  determine that the first receiving device is trustworthy based on the comparison showing that the first receiving device unique identifier contained in the second record matches the first receiving device unique identifier;
accept the token, by the second receiving device, based on the determination that the first receiving device is trustworthy, wherein the token is transmitted from network participating device to network participating device on the network on a rotating basis to ensure that every network participating device receives the token over a predetermined period of time thereby to test the integrity/identity of each network participating device on the network that is participating in the Blockchain.

2. The transmission system of claim 1 wherein data from or pertaining to the first record is contained in the ledger.

3. The transmission system of claim 1 wherein the data record structures are contained within a wallet.

4. The transmission system of claim 1 wherein the data record structures further include a second IP address record.

5. The transmission system of claim 3 wherein the wallet also has access to a transaction ledger which uses block chain protocols to remain in sync with other ledgers in the network.

6. The transmission system of claim 4 wherein the second IP address record contains the receiving device IP address.

7. The transmission system of claim 1 wherein the data record structures further include a third record.

8. The transmission system of claim 1 wherein the data record structures further include a fourth record.

9. The transmission system of claim 1 wherein the first record contains token identifying data which uniquely identifies a token.

10. The transmission system of claim 8 wherein the token is being exchanged between the initiating device and the first receiving device.

11. The transmission system of claim 7 wherein the third record contains data which uniquely identifies a sending party.

12. The transmission system of claim 8 wherein the fourth record contains data which uniquely identifies a receiving party.

13. The transmission system of claim 1 wherein the data record structures further include a hash range.

14. The transmission system of claim 1 wherein the data record structures are stored on an intermediate database as an intermediate database record.

15. The transmission system of claim 14 wherein a hash of the data record structures are stored on the intermediate database as part of the intermediate database record.

16. The transmission system of claim 14, wherein the intermediate database record is stored on a plurality of intermediate databases; each intermediate database separate and distinct from any other of the plurality of intermediate databases.

17. The transmission system of claim 16 wherein the plurality of intermediate databases form part of BlockChain network.

18. The transmission system of claim 16 wherein the data record structures are accompanied by a public key which is shared with the rest of the network for identification, encryption and decryption purposes.

19. The transmission system of claim 18 wherein the data record structures include a private key which is used for authentication, encryption and decryption purposes.

20. The transmission system of claim 1 wherein the token comprises an alphanumeric sequence whose primary purpose is to be sent from device to device thereby to trigger tests of device identity by way of ledger verification that takes place as part of the Blockchain protocol.

21. A method of verification of identity of network devices in a transmission system and participating in a Blockchain; each network device comprising a network participating device that includes at least a processor and memory by which each network participating device communicates data record structures between the network participating devices; the transmission system transmitting the data record structures over a network of the network participating devices; the network of network participating devices operating as a Blockchain; said Blockchain comprising a plurality of ledgers held on a plurality of said network participating devices; each ledger comprising said data record structures; said method comprising:
  incorporating a unique identifier record representing a unique identifier of the network device within the ledger maintained by the network devices;
  generating, by an initiating device of the network participating devices, an initial data record structure, wherein the initiating device has an initiating device unique identifier; and the initial data record structure contains at least a first record comprising:
    a token; and
    the initiating device unique identifier;

transmitting, by the initiating device, the initial data record structure over the network to a first receiving device of the network participating devices, wherein the first receiving device has a first receiving device unique identifier;

testing, by the first receiving device, the integrity and identity of the initiating device by:

comparing the initiating device unique identifier contained in the first record with the initiating device unique identifier;

determining that the initiating device is trustworthy based on the comparison showing that the initiating device unique identifier contained in the first record matches the initiating device unique identifier;

accepting the token, by the first receiving device, based on the determining that the initiating device is trustworthy;

generating, by the first receiving device, an additional data record structure that contains at least a second record comprising:

the token, and the first receiving device unique identifier;

transmitting, by the first receiving device, the additional data record structure to a second receiving device of the network participating devices that has not yet received the token; by:

testing, by the second receiving device, the integrity and identity of the initiating device comparing the first receiving device unique identifier contained in the second record with the first receiving device unique identifier;

determining that the first receiving device is trustworthy based on the comparison showing that the first receiving device unique identifier contained in the second record matches the first receiving device unique identifier;

accepting the token, by the second receiving device, based on the determining that the initiating device is trustworthy, wherein the token is transmitted from network participating device to network participating device on the network on a rotating basis to ensure that every network participating device receives the token over a predetermined period of time thereby to test the integrity and identity of each network participating device on the network that is participating in the Blockchain.

\* \* \* \* \*